United States Patent [19]
Sweeney, Jr.

[11] Patent Number: 5,971,654
[45] Date of Patent: *Oct. 26, 1999

[54] FULL FLOATING AXLE ROTATING CAPS

[76] Inventor: Thomas J. Sweeney, Jr., 1107 Hoffman Canal, North Wildwood, N.J. 08260

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,912

[22] Filed: Jan. 31, 1997

[51] Int. Cl.$^6$ ..................................................... B25G 3/36
[52] U.S. Cl. ........................... 403/400; 403/384; 280/686
[58] Field of Search ................................ 403/400, 384; 280/718, 686, 699; 180/905, 378, 379, 380

[56] References Cited

U.S. PATENT DOCUMENTS

| | | |
|---|---|---|
| 1,539,352 | 5/1925 | Fekete et al. ........................ 280/718 X |
| 1,750,665 | 3/1930 | Fry . |
| 1,900,938 | 3/1933 | Kerruish . |
| 2,434,304 | 1/1948 | Wilson ................................ 280/686 X |
| 2,631,682 | 3/1953 | Gale .................................... 280/718 X |
| 2,788,224 | 4/1957 | Ramun et al. . |
| 2,929,618 | 3/1960 | Hutchens ............................ 280/718 X |
| 2,988,352 | 6/1961 | Masser . |
| 3,003,782 | 10/1961 | Hickman . |
| 3,112,014 | 11/1963 | Jeffries ................................ 280/718 X |
| 3,117,772 | 1/1964 | Brown ................................. 280/686 X |
| 3,126,073 | 3/1964 | Sauer ................................... 280/718 X |
| 3,194,580 | 7/1965 | Hamlet ................................ 280/718 X |
| 3,246,911 | 4/1966 | Jurgens ..................................... 280/686 |
| 3,257,123 | 6/1966 | Giovinazzo . |
| 3,428,372 | 2/1969 | Keller et al. . |
| 3,434,734 | 3/1969 | Poulos . |
| 3,464,882 | 9/1969 | Morton . |
| 3,494,609 | 2/1970 | Harbers, Jr. . |
| 3,684,324 | 8/1972 | Sterner . |
| 3,690,399 | 9/1972 | Bokovoy et al. . |
| 4,061,364 | 12/1977 | Parks . |
| 4,082,377 | 4/1978 | Saunders . |
| 4,125,276 | 11/1978 | Levasseur ............................... 280/718 |
| 4,226,441 | 10/1980 | Lampert ................................. 280/718 |
| 4,504,099 | 3/1985 | Miki et al. . |
| 4,575,145 | 3/1986 | Wolfram et al. . |
| 4,633,564 | 1/1987 | Sauber . |
| 5,032,029 | 7/1991 | Pratt et al. . |
| 5,118,070 | 6/1992 | Reid . |
| 5,119,543 | 6/1992 | Reilly . |
| 5,123,672 | 6/1992 | Walton et al. ..................... 280/669 X |

Primary Examiner—Terry Lee Melius
Assistant Examiner—William L. Miller
Attorney, Agent, or Firm—Thomas A. Lennox; James J. Murtha

[57] ABSTRACT

A device for mounting a leaf spring to an axle housing of a vehicle, in which a cap device receives the axle housing of the vehicle. A liner is positioned inside the cap to permit rotational movement of the axle housing. A pair of U-bolts is mounted on the cap and extends down from the cap toward the leaf spring. First and second plates engage the U-bolts to present a pair of parallel plates positionable on top and bottom of the leaf spring, respectively. Preferably, the liner is fabricated from a low friction material such as polytetrafluoroethylene. To prevent aixal movement of the device, stops engage the axle housing. Stabilizing plates maintain the top, first plate generally parallel to the leaf spring and prevent relative movement of the first plate and the U-bolts. Spacers maintain a minimum spacing between the first and second plates on the U-bolts. In a preferred embodiment, a low friction surface is provided on the portion of the plates in contact with the leaf spring.

13 Claims, 2 Drawing Sheets

FULL FLOATING AXLE ROTATING CAPS

FIELD OF THE INVENTION

The present invention relates to a device for mounting a leaf spring to an axle of a vehicle. More particularly the present invention relates to a mounting device for leaf springs on vehicles which employ traction bars and the like, in which the mounting device rotates freely to keep driving forces off the spring and permit transfer of power from the axle to the traction bar, resulting in improved traction, control and performance.

BACKGROUND OF THE INVENTION

Even before motorized vehicles were invented, it has been desirable to mount spring elements on the axles of carriages and the like to improve the ride, both to give passenger comfort and to reduce stresses on the vehicle suspension to prevent damage or reduce wear during operation. In motorized vehicles, particular concern has been given to the method of mounting suspension like components such as leaf springs to the drive or power axle of the car, truck or other vehicle.

To improve traction, control and performance, devices such as traction bars, ladder bars or four link rear suspensions are added to the vehicle. For example traction bars are designed to be rigid and push the vehicle from a point nearer the center of the vehicle allowing greater lift to the front end of the vehicle which improves traction and performance. The leverage from the drive axle is designed to be transmitted to the traction bars. These traction devices also stabilize the rear of the vehicle during acceleration and stopping thus increasing control of the vehicle.

Many existing devices are available that connect the axle housing and leaf spring of motorized vehicles. For example U.S. Pat. No. 4,061,364 entitled LEAF SPRING SUSPENSION SYSTEM issued to Robert R. Parks discloses a relatively standard suspension that has parallel threaded U-bolts 22 surrounding rear axle 16 and which extend towards leaf spring 28. Plate 20 is positioned on top of leaf spring 28 with the ends of U-bolts extending through holes in the corners of plate 20. Plate 20 is securely held to leaf spring 28 by bolts 24 which in turn secures leaf spring 28 to axle 16. Since U-bolts 22 are fixedly attached to axle 16, this prevents rotational movement of axle 16 relative to leaf spring 28.

U.S. Pat. No. 3,434,734 entitled AUXILIARY SPRING, issued to Gus L. Poulos, discloses another standard design that retains the central portion of leaf spring 20 between spring pads 21 and 22 fixedly attached to axle assembly 24 below frame 10 of the vehicle and is clamped by U-bolts 26 and a pressure plate 28 on top of leaf spring 20. Again, spring pads 21 and 22 prevent rotational movement of axle assembly 24 relative to leaf spring 20.

Similarly, U.S. Pat. No. 2,788,224 entitled SPRING SUSPENSION FOR LOAD-BEARING ROAD VEHICLES, issued to Michael Ramun et al., discloses a spring suspension device connecting load-bearing axle 18 and springs 11 and 12 whereby axle 18 is fixedly attached to the spring suspension device by split fittings 15. Split fittings 15 prevent rotational movement of axle 18 relative to springs 11 and 12.

There are several other patents of interest that disclose various devices connecting leaf springs to axle housings such as U.S. Pat. Nos. 5,119,543, issued to Bruce J. Reilly and 4,633,564, issued to Charles J. Sauber. Both of these patents also disclose a mounting preventing rotational movement of the axle housing relative to the leaf springs.

U.S. Pat. No. 3,257,123 entitled SPRING SUSPENSION FOR A VEHICLE, issued to Joe. L. Giovinazzo, discloses a fixed mount of a leaf spring 25/coil spring 22 combination with U-bolts 29. Although Giovinazzo discloses the use of nylon inserts 32 to prevent squeaking, it does not teach or suggest a moveable mount for an axle housing relative to the overall mount and a leaf spring.

It is noted that these previous devices do not allow for the free rotation of the axle housing relative to the leaf spring. Thus, at least some of the power and leverage from the drive axle is not transmitted to the drive wheels via traction bars, ladder bars, etc., as desired, but instead is transmitted to the leaf spring. This power and leverage loss decreases the efficiency of the drive system by not allowing the transfer of all the drive axle's power. Additionally, these traction devices with a rigid axle housing mount may allow spring wrap-up which causes wheel hop, lost traction and decreased control of the vehicle, sometimes with disastrous results.

In one instance it has been proposed to provide a floating housing mount for use with leaf spring suspensions when combined with ladder bars. The design, manufactured by Competition Engineering, employs two rollers in a floating housing mount. In this device, the entire rear end housing spins freely within its mounting. However the Competition Engineering Design requires multiple parts and requires great precision and high cost in the assembly of the rollers in the housing mount before it is mounted to the leaf spring and axle housing.

A roller assembly is not completely efficient in transmitting power and leverage from the drive axle to ladder bars, etc. The housing for the axle housing of the Competition Engineering Design is split and is connected by bolts and washers for assembly to the axle housing. As can be appreciated, such a construction weakens the design as compared to a one piece or welded design. Further, the roller assembly of the Competition Engineering Design does not present a smooth cylindrical surface so that any misalignment will cause wear and eventual failure as the bolts engage the rotatable axle housing. Of course, as soon as the vehicle is driven, misalignment begins as stresses on the rollers causes deformation or other adverse reactions with the axle housing.

Further, the nut and bolt assembly of the Competition Engineering Design does not present a planar side surface. Thus, when planar surface stops that are placed on the axle housing to prevent lateral movement of the Competition Engineering Design, uneven pressure is exerted on the Competition Engineering Design when it engages the stops. This can cause misalignment or cocking of the Competition Engineering Design and thus the leaf spring in relation to the axle housing, reducing the effectiveness in transmitting the power and leverage from the axle to the traction devices and the vehicle in general.

Accordingly, it is an object of the present invention to provide a leaf spring suspension that allows for free rotation of the axle housing relative to the leaf spring without the use of parts that are required to move during operation of the mount.

Another object of this invention is to provide a device which allows transmission of substantially all the power and leverage of a drive axle to traction bars, ladder bars, etc., to increase traction, control and performance of a vehicle.

Yet another object of the present invention is to provide a device capable of preventing spring wrap-up and wheel hop, and the resultant loss of traction and control of a vehicle.

Still another object of the present invention is to provide a device having a minimum of moving parts while allowing free rotation of the axle housing relative to the leaf spring.

Another object of the present invention is to provide a full floating axle rotating cap device of a sturdy design reducing its maintenance and repair costs.

A further object of the present invention is to provide a full floating axle rotating cap device that presents relatively planar side surfaces proximate the axle housing and to include stops on the axle housing to limit or prevent axial movement of the full floating axle rotating cap device on the axle housing.

Other objects will appear hereinafter.

SUMMARY OF THE INVENTION

It has now been discovered that the above and other objects of the present invention may be accomplished in the following manner. Specifically, the present invention provides a device for mounting a leaf spring to the rear or drive axle housing of a vehicle so that power and leverage from the axle is transmitted to the wheels more efficiently and effectively.

The present invention allows the rear assembly of the drive mechanism to rotate freely without causing spring wrap-up, which in turn will cause the vehicle's tires to hop or otherwise lose traction. The present invention also stabilizes the rear of the vehicle during acceleration or deceleration. The device subject of the present invention is also intended for use with tractor trailers, such as when the brakes are locked up in an emergency stopping situation, so that the wheels have greater contact with the roadway because hop or other undesired movement is reduced or eliminated.

In certain vehicles such as race cars, drag racing cars and the like, it is desirable to employ additional components in the suspension assembly. For example, a leaf spring and ladder bar set-up provides two different points at which the rear end pivots. The present invention allows the rear axle housing to rotate freely in the sleeve provided therefor, taking the driving force off the spring and putting the power from the rear to a heavy duty traction bar, which itself is rigid, to push the vehicle from a point further toward the center of the vehicle. This causes greater lift to the front end, and in turn improves traction, control and performance.

In its simplest form, the device of this invention comprises a cap for receiving an axle housing so that a sleeve is positioned inside the cap to permit rotational movement of the axle housing. Preferably the sleeve is fabricated from a low friction material such as polytetrafluoroethylene so that at least a portion of the axle housing in the sleeve is in contact with the low friction material. It is this rotation that allows movement of the axle housing with respect to the leaf spring without reducing the power and leverage transmitted to the drive wheels and the like. A spaced mounting element such as a pair of U-bolts is mounted on the cap and extends down from the cap toward the leaf spring. The leaf spring is held between a pair of plates that are positioned on the top and bottom of the leaf spring and are clamped with nuts on the bolts that extend through holes in the plates.

Stops, such as clamped or keyed discs on the axle housing, are positioned to prevent axial movement of the device. The cap includes outwardly extending stabilizing plates to position and hold the top plate generally parallel to the leaf spring and prevent relative movement of the first top plate and the U-bolt extensions. The second lower plate is held stationary as well by the nuts on the terminal ends of the U-bolts.

In a preferred embodiment, spacers are provided for maintaining a minimum spacing between the first and second plates as they are supported on the mounting element. This prevents undue compression on the leaf spring during operation of the device and insures relatively parallel support of the leaf spring by the plates. Also preferred is to place a low friction cushioning surface, such as polytetrafluoroethylene spacers, between each of the plates and the leaf spring to absorb any excessive shock or forces.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
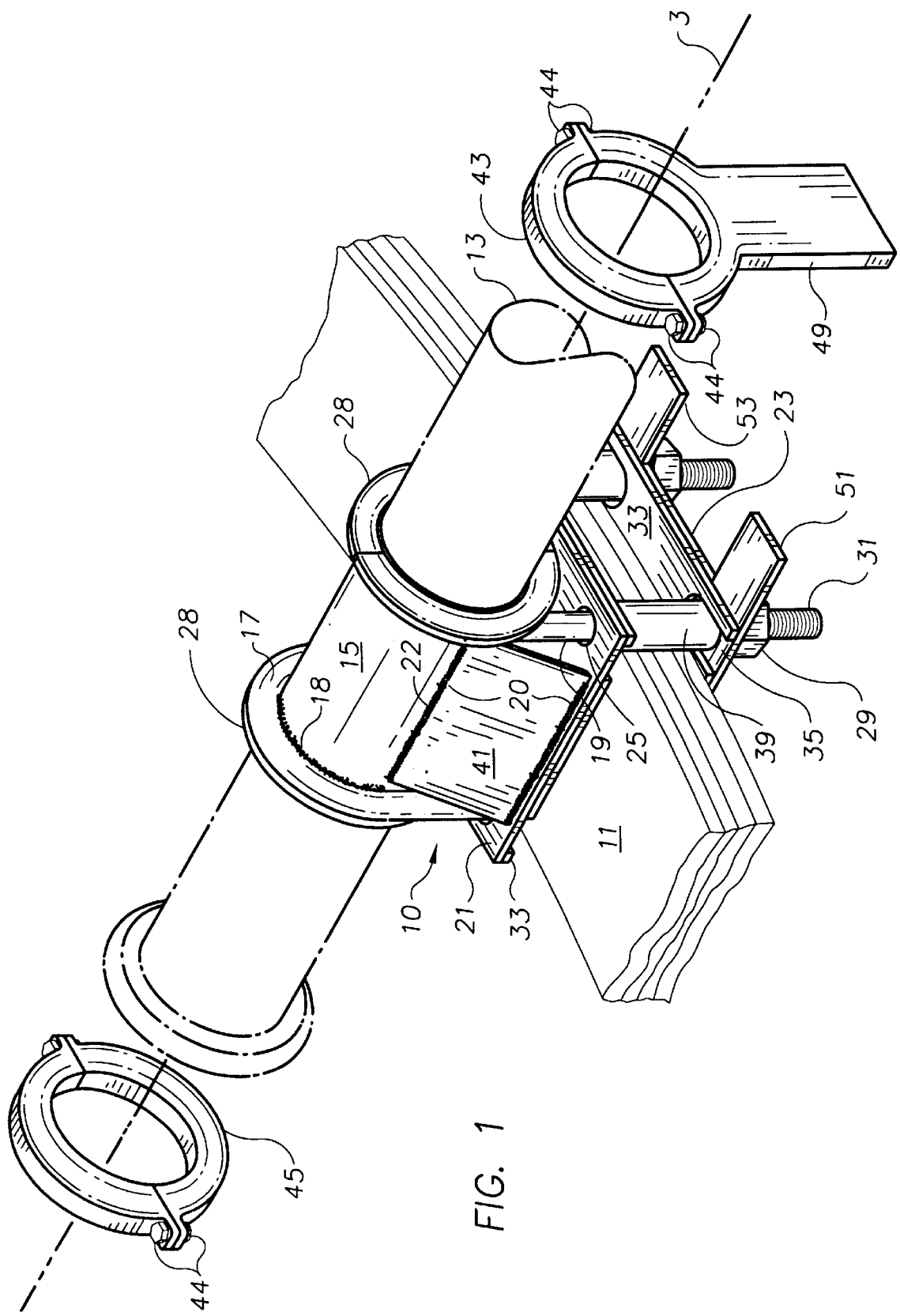
FIG. 1 is a perspective view of a device of this invention, mounted on a leaf spring to an axle of a vehicle, all in accordance with the invention.

As shown in the drawings, the full floating axle rotating caps device 10 of the present invention is generally shown mounting a leaf spring 11 to an axle housing 13 of a vehicle. The axle housing 13 is normally the rear or drive axle of the vehicle, as the present invention is admirably suited to transfer power from an axle to a drive wheel without reducing the power due to movement of the leaf spring with respect to the axle housing, such as when accelerating or encountering rough surfaces. Axle housing 13 rotates about axis 3.

Figure 2:
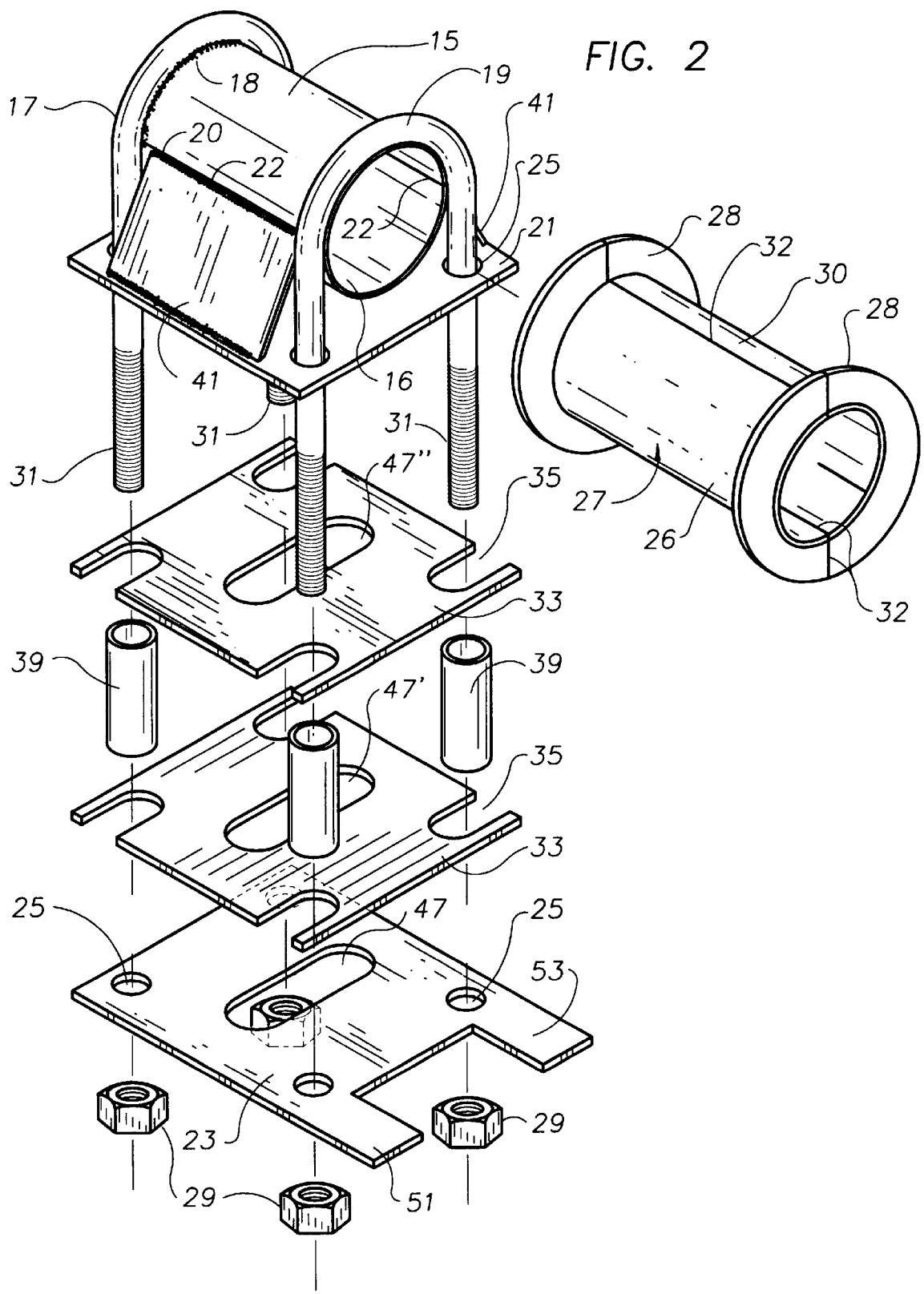
FIG. 2 is an exploded view of the device shown in FIG. 1.

As shown in FIGS. 1 and 2, the device 10 includes upper cylindrical metal cap 15, which mates along longitudinal adjacent edges 22 with lower cylindrical tube section 16 to form a cylindrical shape surrounding axle housing 13. First and second metal U-bolts 17 and 19 are fixedly attached at the open ends of cap 15 parallel to each other and both oriented in the same direction. U-bolts 17 and 19 are welded to cap 15 and provide an unobstructed access to interior of the cylindrical shape formed by cap 15 and section 16. The axially outer sides of U-bolts 17 and 19 present a planar surface that preferably extends axially outward from the ends of cap 15 and section 16.

Upper plate 21 and lower plate 23 include holes 25 at each corner thereof for the receipt of U-bolts 17 and 19. U-bolts 17 and 19 engage upper plate 21 through upper plate holes 25. Upper plate 21 is preferably fixedly attached to section 16 by angled stability plates 41 that are preferably welded along weld lines 20 at the top proximate to the edges 22 of section 16 and to plate 21 at the bottom as shown. It is also possible to fixedly attach upper plate 21 to the cap 15/U-bolts 17 and 19 structure by other methods such as by welding a concave triangular mounting wedge between the bottom of section 16 and the upper surface of upper plate 21. It is also possible to eliminate stability plates 41 and simply have upper plate 21 rest against the lower surface of section 16.

The cylindrical shape of cap 15 and section 16 and U-bolts 17 and 19 may be assembled to provide maximum strength and minimum manufacturing costs by first axially cutting a cylindrical shape to provide an upper cap 15 and a lower section 16, so that U-bolts 17 and 19 may be more easily welded to the top surface of cap 15. Stability plates 41 are then welded in place on section 16, as shown, again by welding. Finally, upper plate 21 is welded to stability plates 41 to complete assembly of a rigid, stable structure capable of supporting the leaf spring 11 on axle housing 13.

Threaded nuts 29 engage the threaded portion of U-bolts 17 and 19, respectively, to maintain the position of lower plate 23 relative to upper plate 21. As shown in FIG. 1, leaf spring 11 is securely clamped between upper plate 21 and lower plate 23 by threaded nuts 29 on the threaded portion 31 of U-bolts 17 and 19.

Friction plates 33 may be inserted between the lower surface of upper plate 21 and the upper surface of leaf spring 11, and between the upper surface of lower plate 23 and the lower surface of leaf spring 11 to absorb any excessive shock or forces. Friction plates 33 include slots 35 at each corner thereof for the receipt of U-bolts 17 and 19 and to position friction plates 33. Friction plates 33 are made of a low friction material, preferably polytetrafluoroethylene, Which allows movement of device 10 on spring 11 as the traction bars present one point of attachment and the front half of the spring another. Spring 11 must be free to move as the ride height changes or rough surfaces are encountered so they will not bind. This movement is, however, minimal. Leaf spring 11 only engages at least a part of friction plates 33 and not the surfaces of plates 21 and 23, whereby the assembly does not have metal-on-metal contact, and squeaks or other noise is effectively eliminated.

Cylindrical metal spacers 39 may be placed on the legs of the U-bolts 17 and 19 to space lower plate 23 a minimum distance from upper plate 21. Spacers 39 are capable of absorbing a great deal of shock force in their axial direction and prevent plates 21 and 23 from becoming misaligned.

Mounted within the cylindrical space of cap 15 and section 16 is a cylindrical sleeve or liner 27, preferably made of polytetrafluoroethylene or another low friction material, whereby the axle housing 13 is supported on and engages liner 27 and not the interior of cap 15 and section 16. Liner 27 may also include flanges 28 at its longitudinal ends to engage stop rings 43 and 45. Stop rings 43 and 45 are fixedly attached to the axle housing 13 by tightening self locking bolt/nut combinations 44 and 44', respectively, on each lateral side of the stop rings, the position of the stop rings being proximate either side of the cap 15/section 16/U-bolts 17, 19 structure to limit or prevent lateral movement thereof. Stop rings 43 may be clamped or keyed discs, for example, and are mounted on axle housing 13. In a preferred embodiment, liner 27 is split longitudinally along lines 32 into two sections 26 and 30 for easy insertion into the cylindrical shape enclosed by cap 15 and section 16 without deforming flanges 28. Stop ring 43 is preferably equipped with radial arm 49 extending vertically downwardly to position a lower section between stop arms 51 and 53 extending outwardly from lower plate 23 to provide limits of rotational movement.

Flanges 28 present a planar surface for engaging stop rings 43 and 45. It is noted that even without flanges 28, the surfaces of U-bolts 17 and 19 also each present a relatively planar surface for engaging stop rings 43 and 45. These planar surfaces are important in that device 10 is limited in its axial movement along axle housing 13 by stop rings 43 and 45 without undue or uneven stress on device 10. Specifically, cap 15 won't be subjected to non axial forces such as by being cocked at an angle because nothing is interposed between the stop rings 43 and 45 and the surface of the U-bolts 17 or 19. Further, if liner 27 rotates with axle housing 13, then the low friction planar surface presented to stops 43 eliminate possible binding or loss of rotational freedom of axle housing 13 relative to leaf spring 11.

Slot 47 through plate 23 and slots 47' and 47" through friction plates 33 provide space for attachment heads extending out the springs 11 to move back and forth within the slots during use without contacting device 10.

The full floating axle rotating caps device 10 of the present invention is generally used with leaf spring vehicles which also include devices such as traction bars, ladder bars or four link rear suspensions which themselves are used to provide increased traction and stability. The device 10 of the present invention may also be used with unmodified street vehicles to provide similar benefits. The device 10 connects the vehicle leaf spring 11 to the vehicle axle housing 13 allowing for rotational movement of the axle housing 13 which permits the power and leverage of the drive axle within the axle housing to be transmitted efficiently and effectively.

The split liner 27 is placed around axle housing 13 of a vehicle and is inserted into the interior of the cylindrical cap 15 and lower section 16. The axle housing is free to rotate within the liner 27, The cap 15/section 16/U-bolts 17 and 19 structure with the attached upper plate 21 and upper friction plate 33 is positioned approximately over the middle of leaf spring 11 with the threaded portion 31 ends of U-bolts 17 and 19 straddling leaf spring 11. Spacers 39 are placed on each respective leg of U-bolts 17 and 19, then lower friction plate 33 and lower plate 23 are placed under leaf spring 11 with U-bolts 17 and 19 inserted through slots 35 and holes 25 of lower friction plate 33 and lower plate 23, respectively. Threaded nuts 29 are placed on the threaded portion 31 of U-bolts 17 and 19 and are tightened evenly to fixedly secure leaf spring 11 to the full floating axle rotating caps device 10 of the present invention.

Spacers 39 provide a minimum spacing between the upper and lower plates 21 and 23, respectively, to avoid over stressing leaf spring 11 and to ensure leaf spring 11 is clamped by parallel plates 21 and 23. Liner 27 allows for a low friction, uniform stressed rotation of axle housing 13 within cap 15. This free rotation allows for efficient and effective transmission of the power and leverage of the drive axle to the traction bars, etc., which direct the force to a point more in the center of the vehicle increasing traction and stability of the vehicle. Without such free rotation of the axle housing 13 about axis 37, spring wrap-up may occur whereby the power and leverage of the drive axle is instead absorbed by the leaf spring 11 which may cause wheel hop, lost traction and decreased control of the vehicle. Stops 43 prevent axial movement of device 10 along axle housing 13 and the planar surfaces presented to stops 43, either by flanges 28 or the planar surface of the U-bolts 17 or 19, provide for uniform pressure against device 10 limiting axial movement. The planar surfaces also eliminate any binding of stops 43 as the axle housing 13 rotates.

The full floating axle rotating caps device 10 of the present invention has been tested and has been found able to provide substantially improved traction in acceleration tests when combined with traction bars and the like and permits shorter stopping distances in trucks and other vehicles.

While particular embodiments of the present Invention have been illustrated and described, it is not intended to limit the invention. except as defined by the following claims.

I claim:

1. A device adaptable for mounting to a leaf spring of a vehicle, the leaf spring having a top and a bottom, the device comprising:

an axle housing for being positioned above the top of the leaf spring, the axle housing comprising an outer surface, cap means for receiving the axle housing, the cap means comprising an inner surface that abuts the outer surface of the axle housing;

liner means fabricated from a low friction material positioned between the inner surface of the cap means and the outer surface of the axle housing to permit rotational movement of the axle housing against the liner means with essentially no frictional resistance; and spaced mounting means on said cap means and extending downwardly from said cap means;

said spaced mounting means including:
(a) parallel first and second plates for being positioned respectively on the top and the bottom of the leaf spring, and
(b) fastening means for fastening said plates in compression on the leaf spring and for supporting the cap means on the leaf spring.

2. The device of claim 1, wherein the fastening means comprises a pair of U-bolts mounted on said cap means and extending downwardly from said cap means.

3. The device of claim 1, where the low friction material is polytetrafluoroethylene.

4. The device of claim 1, which further includes stop means for engaging the axle housing to prevent axial movement of said device thereon.

5. The device of claim 4, wherein said liner means include flanges extending radially outwardly from the axle housing at both terminal ends of the liner means.

6. The device of claim 1, wherein said further fastening means further includes stabilizing means for maintaining said first plate generally parallel to the leaf spring.

7. The device of claim 6, wherein said stabilizing means prevents relative movement of said first plate and said cap means.

8. The device of claim 1, which further includes spacer means for maintaining a minimum spacing between said first and second plate.

9. The device of claim 1, which further includes providing a low friction surface on a portion of said plates for contact with the leaf spring.

10. A device adaptable for mounting on a leaf spring of a vehicle, the leaf spring having a top and a bottom, the device comprising:

an axle housing for being positioned above the top of the leaf spring, the axle housing comprising an outer surface, cap means for receiving the axle housing, the cap means comprising an inner surface that abuts the outer surface of the axle housing and stop means for engaging the axle housing to prevent axial movement of said device thereon;

low friction liner means positioned between the inner surface of the cap means and the outer surface of the axle housing to permit rotational movement of the axle housing against the liner means with essentially no frictional resistance, the liner means having flanges extending radially outwardly from the axle housing at both terminal ends of the liner means;

parallel first and second plates for being positioned respectively on the top and the bottom of the leaf spring, and fastening means for fastening said plates in compression on the leaf spring and for supporting the cap means on the leaf spring, said fastening means including a pair of U-bolts mounted on said cap means and extending downwardly from said cap means said plates including stabilizing means for maintaining said first plate generally parallel to the leaf spring and preventing relative movement of said first plate and said U-bolts.

11. The device of claim 10, where the low friction liner means is formed from polytetrafluoroethylene.

12. The device of claim 10, which further includes spacer means for maintaining a minimum spacing between said first and second plate.

13. The device of claim 10, which further includes providing a low friction surface on a portion of said first and second plates for contact with the leaf spring.

* * * * *